US 6,643,948 B1

(12) United States Patent
Seymour

(10) Patent No.: US 6,643,948 B1
(45) Date of Patent: Nov. 11, 2003

(54) DUAL MODE RULE ASSEMBLY

(76) Inventor: Daniel Seymour, 196 E. Chippens Hill Rd., Burlington, CT (US) 06013

( * ) Notice: Subject to any disclaimer, the term of this patent is extended or adjusted under 35 U.S.C. 154(b) by 0 days.

(21) Appl. No.: 10/183,024

(22) Filed: Jun. 27, 2002

(51) Int. Cl.[7] ............................................. G01B 3/10
(52) U.S. Cl. ......................................................... 33/767
(58) Field of Search ........................ 33/755, 760, 761, 33/767, 768, 769, 770; 242/381.3

(56) References Cited

U.S. PATENT DOCUMENTS

| | | |
|---|---|---|
| 3,164,907 A | 1/1965 | Quenot |
| 3,220,112 A * | 11/1965 | Quenot ........................ 33/769 |
| 3,610,548 A | 10/1971 | Quenot |
| 3,662,969 A | 5/1972 | King |
| 4,153,996 A | 5/1979 | Rutty |
| 4,288,293 A | 9/1981 | Saller |
| 4,899,460 A | 2/1990 | Kang |
| 4,927,092 A * | 5/1990 | Ingram et al. ........... 242/381.3 |
| 4,938,430 A | 7/1990 | Chapin |
| 4,998,356 A | 3/1991 | Chapin |
| 5,007,178 A | 4/1991 | Dewire et al. |
| 5,245,761 A * | 9/1993 | Waldherr ..................... 33/767 |
| 5,367,785 A | 11/1994 | Benarroch |
| 5,395,069 A * | 3/1995 | Chen ........................ 242/381.3 |
| 5,400,520 A | 3/1995 | Hillinger |
| 5,657,551 A * | 8/1997 | Lin .............................. 33/767 |
| 6,026,585 A * | 2/2000 | Li ................................ 33/767 |
| 6,032,380 A | 3/2000 | Li |
| 6,085,433 A * | 7/2000 | Li ................................ 33/767 |
| 6,182,916 B1 * | 2/2001 | Lin .............................. 33/761 |
| 6,276,071 B1 * | 8/2001 | Khachatoorian ............. 33/767 |
| 6,491,248 B1 * | 12/2002 | Liu ........................... 242/381.3 |

* cited by examiner

Primary Examiner—G. Bradley Bennett
(74) Attorney, Agent, or Firm—Pillsbury Winthrop LLP

(57) ABSTRACT

A dual mode rule assembly includes a housing, a reel, an rule connected to the reel, a spring system to wind the rule around the reel, a mode selector structure manual movable between first mode and second mode positions, and a manually releasable spring-biased brake assembly operatively associated with the mode selector structure. When the mode selector structure is in the first mode position, the brake assembly enables controlled retraction of the rule toward and into the housing containing position under bias of the spring system after the rule has been manually moved outwardly from the housing by the manual release of the brake assembly. When the mode selector structure is in the second mode position, the brake assembly allows uncontrolled retraction of the rule toward and into the housing containing position under bias of the spring system after the rule has been manually moved outwardly from the housing.

15 Claims, 6 Drawing Sheets

DUAL MODE RULE ASSEMBLY

FIELD OF THE INVENTION

The present invention relates to retractable rule assemblies.

BACKGROUND OF THE INVENTION

Retractable rule assemblies are well known in the art. Typically, rule assemblies are of the power lock type or the level lock type. In power lock rule assemblies, the rule is normally released from the lock to enable uncontrolled retraction into and out of the housing. The user must manually actuate the lock to hold the rule in an extended position against the retracting force of the spring. In lever lock rule assemblies, the rule is normally held in an extended position by the lock. The user must manually release the lock to enable the rule to retract into the housing by the retracting force of the spring.

The power lock and lever lock rule assemblies are typically manufactured and used separately. However, this may become inconvenient to those who wish to utilize both types of rule assemblies. Accordingly, there is a need for a rule assembly that provides the advantages of both the power lock rule assembly and a lever lock rule assembly.

SUMMARY OF THE INVENTION

It is thus an object of the present invention to address the need noted above. In accordance with the principles of the present invention, this objective is achieved by providing a dual mode rule assembly including a housing having an opening, a reel rotatably mounted in the housing, an elongated rule connected to the reel so as to wind therearound into a housing contained position wherein an end of the rule extends from the opening in a position to be manually engaged, and a spring system for biasing the reel in a direction to wind the rule around the reel into the housing contained position and enabling the rule to be manually moved outwardly of the opening against the bias of the spring system. A mode selector structure is carried by the housing for manual movement between first mode and second mode positions. A manually releasable spring-biased brake assembly is operatively associated with the mode selector structure. When the mode selector structure is in the first mode position, the manually releasable spring-biased brake assembly is positioned to enable controlled retraction of the rule toward and into the housing containing position under the bias of the spring system after the rule has been manually moved outwardly from the housing against the bias of the spring system by the manual release of the manually releasable brake assembly. When the mode selector structure is in the second mode position, the manually releasable spring-biased brake assembly is positioned to allow uncontrolled retraction of the rule toward and into the housing containing position under the bias of the spring system after the rule has been manually moved outwardly from the housing against the bias of the spring system.

These and other objects, features and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF PREFERRED EMBODIMENTS

Figure 1:
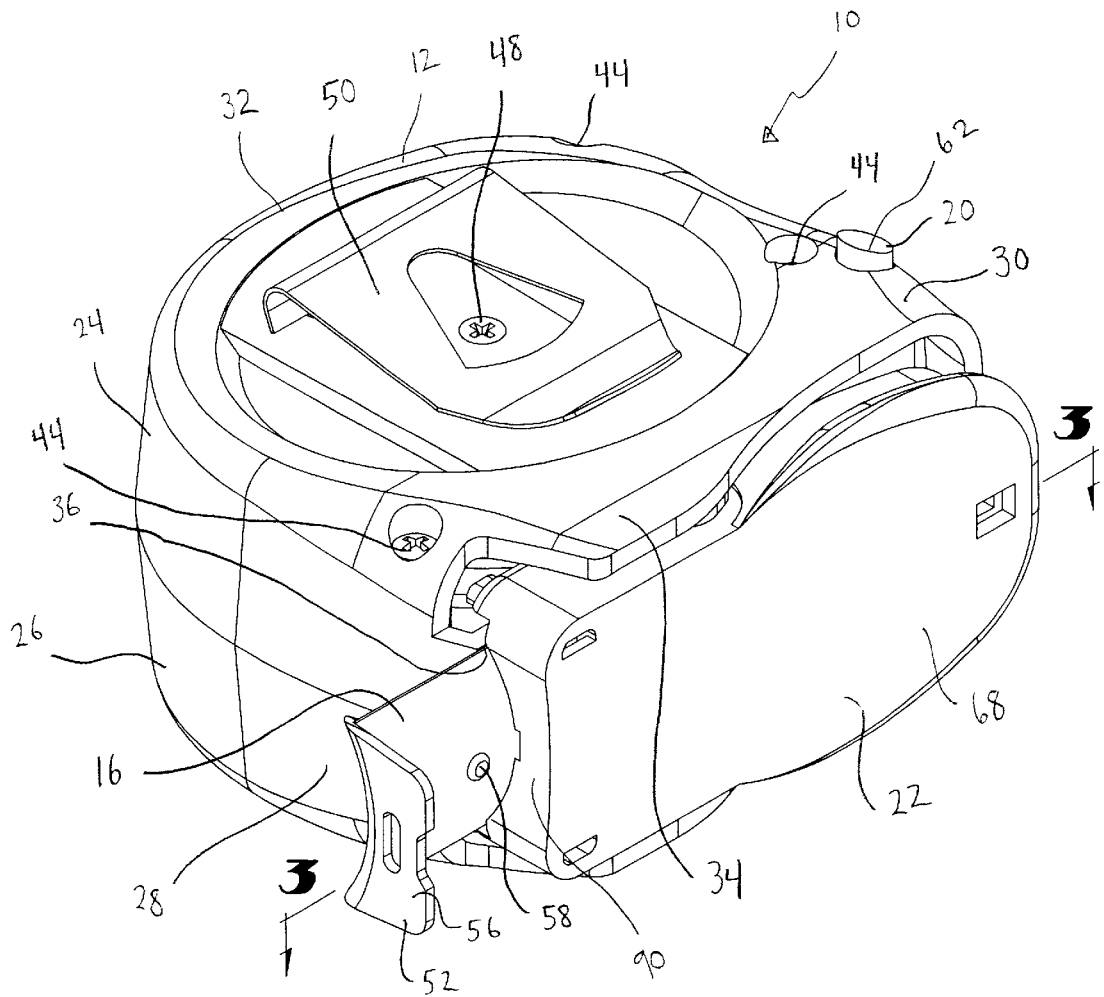
FIG. 1 is a perspective view of an embodiment of a dual mode rule assembly constructed in accordance with the principles of the present invention.
Figure 2:
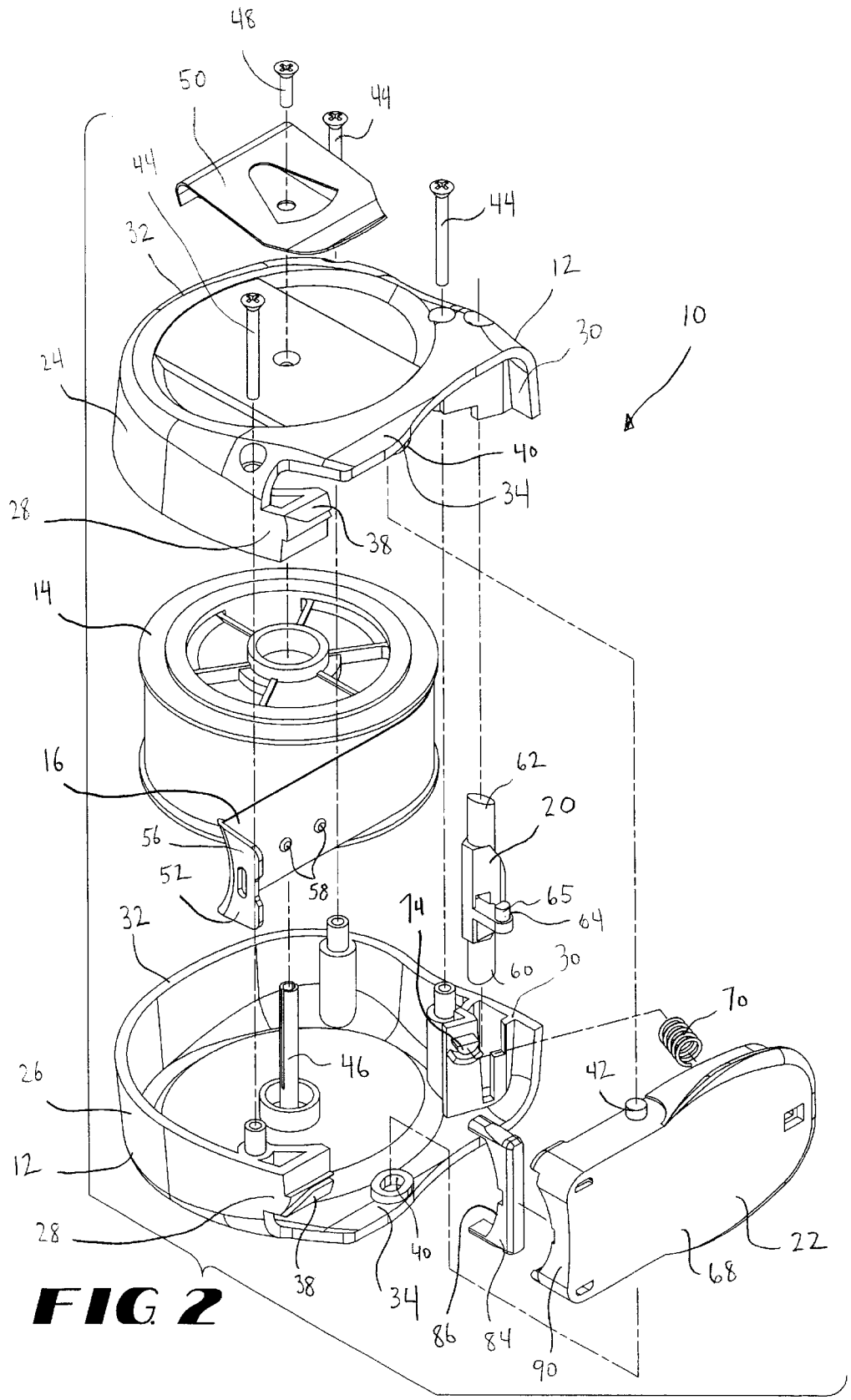
FIG. 2 is an exploded view of the dual mode rule assembly shown in FIG. 1.

FIG. 1 shows a dual mode rule assembly 10 constructed in accordance with one illustrated embodiment of the present invention. As best shown in FIG. 2, the main components of the dual mode rule assembly 10 are a housing 12, a reel 14 rotatably mounted in the housing 12, an elongated rule 16 connected to the reel 14, a spring system 18 for biasing the reel 14 (see FIGS. 3–5), a mode selector structure 20 carried by the housing 12, and a manually releasable spring biased brake assembly 22 operatively associated with the mode selector structure 20.

As shown in FIGS. 1 and 2, the housing 12 is substantially hollow and includes first and second housing halves 24, 26. The first and second housing halves 24, 26 have complimentary configurations and cooperate to provide a housing having a forward rule retaining portion 28, a rearward mode selector portion 30, an upper gripping portion 32, and a lower brake assembly mounting portion 34.

The rule retaining portions 28 of the first and second housing halves 24, 26 cooperate to from an opening 36 from which the rule 16 projects outwardly therefrom. Moreover, the rule retaining portions 28 of the first and second housing halves 24, 26 cooperate to from a braking surface 38 (see FIGS. 2, 9, and 10) that cooperates with a braking surface provided on the brake assembly 22 to control retraction of the rule 16 into the housing 12, as will be further discussed. In the illustrated embodiment, the braking surface 38 has a stepped configuration with the outer portions of the braking surface 38 cooperating with the brake assembly 22 to control rule retraction.

The mode selector portions 30 of the first and second housing halves 24, 26 cooperate to slidably mount the mode selector structure 20 for selective manual movement between first mode and second mode positions, as will be further discussed.

The upper gripping portions 32 of the first and second housing halves 24, 26 are suitably contoured to assist the user in holding onto the housing 12 and to facilitate employment of the rule 16. Specifically, the upper gripping portion 32 of the housing is contoured or arranged, preferably slightly convex, to more comfortably accommodate the palm of the user's hand. The upper gripping portion 32 may include an elastomeric material thereon to further facilitate gripping.

The lower brake assembly mounting portions 34 of the first and second housing halves 24, 26 cooperate to pivotally mount the brake assembly 22. More specifically, the lower brake assembly mounting portions 34 of the first and second housing halves 24, 26 each include an elongated recess 40 that is structured to receive a corresponding projection 42 provided on the brake assembly 22.

The brake assembly 22 is arranged so as to more comfortably accommodate the fingers of the user rather than the palm. Thus, the housing 12 is constructed to be easily held in one hand of a user such that the user's fingers engage the brake assembly 22 and the user's palm and thumb are generally in overlying relation with the upper gripping portion 32 of the housing 12.

In the illustrated embodiment, the first and second housing halves 24, 26 of the housing 12 are held together by fasteners 44 that extend through openings in the first housing half 24 and into threaded posts provided in the second housing half 26. Further, the second housing half 26 includes a reel spindle 46 that extends upwardly from an interior surface thereof. A fastener 48 extends through an opening in the first housing half 24 and threadably engages internal threading in the end of the reel spindle 46. A metal belt clip 50 is secured to the side of the first housing half 24 by the fastener 48.

The reel 14 is rotatably mounted in the housing 12 by the reel spindle 46. Specifically, the spring system 18 is positioned between the reel spindle 46 and the reel 14 to bias the reel 14 in a direction to wind the rule 16 around the reel 14 into a housing contained position and enabling the rule 16 to be manually moved outwardly of the opening 36 in the housing 12 against the bias of the spring system 18. In the illustrated embodiment, the spring system 18 is in the form of a coil spring. The coil spring 18 has one end engaged with the reel spindle 46 and the opposite end engaged with the annular wall portion of the reel 14 that encloses the coil spring 18. Preferably the coil spring 18 is a thin, flat ribbon of metal.

The elongated rule 16 is connected to the reel 14 so as to wind therearound into the housing contained position wherein an end of the rule 16 extends from the opening 36 in the housing 12 in a position to be manually engaged. Specifically, the rule 16 is coiled about the reel 14 with one end connected to the reel 14 and the opposite end extending generally outwardly of the reel 14 through the opening 36 in the housing 12.

As is conventional, the rule 16 is constructed of a ribbon of sheet metal that is configured to have a generally arcuate or concave/convex transverse cross section when the rule is withdrawn from the housing 12 to measure an object and have a flat transverse cross section when the rule 16 is wound around the reel 14. The top concave surface of the rule 16 is printed with measuring lines and digits for measuring lengths and distances.

Further, a hook 52 is provided on the end of the rule 16 to facilitate extension of the rule 16 out of the housing 12 by the user, to prevent engagement of the end of the rule 16 with the object to be measured, and to snugly engage within the opening 36 in the housing 12 to prevent complete retraction of the rule 16 into the interior of the housing 12. The hook 52 includes a mounting portion 54 and a hook portion 56 bent at a generally right angle from an end of the mounting portion 54. The mounting portion 54 is slidably mounted on the end of the rule 16 by a plurality of rivets 58 to allow limited longitudinal relative movement between the hook 52 and the rule 16. The limited sliding engagement allows the rule 16 to be measured externally from an external surface of the hook portion 56 or internally from an internal surface of the hook portion 56.

The rule 16 is generally movable between a retracted position within the housing 12 to an extended position outwardly of the housing 12. As the rule 16 is unwound from the reel 14, the coil spring 18 is wound around the rigidly fixed reel spindle 46. This winding of the coil spring 18 around the reel spindle 46 stores energy in the coil spring 18 to provide spring powered rewinding of the rule 16 around the reel 14 when the extended rule is released.

Figure 6:
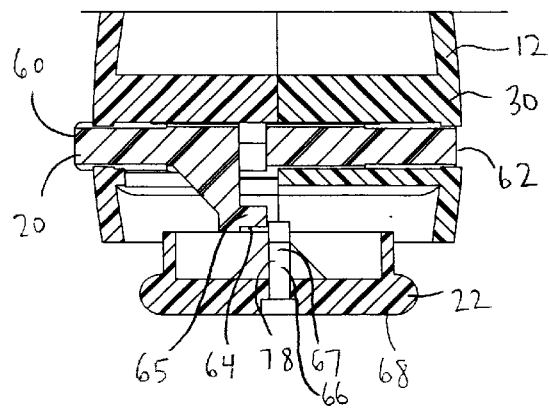
FIG. 6 is a cross-sectional view taken along line 6—6 of FIG. 3 with the mode selector structure in the first mode position and the brake structure biased into the operative position.
Figure 7:
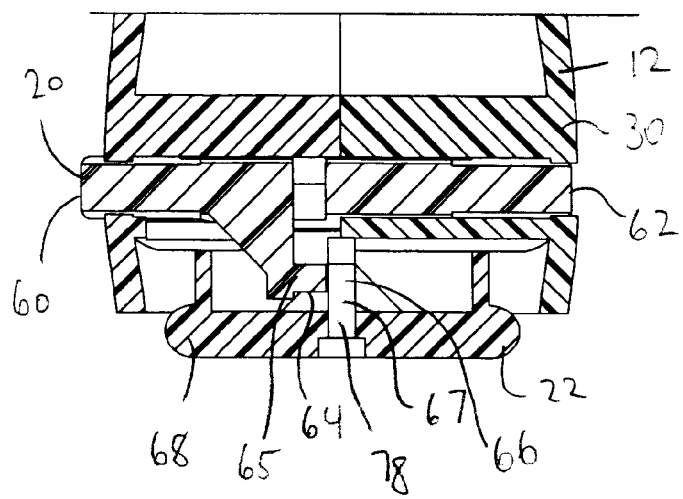
FIG. 7 is a cross-sectional view taken along line 7—7 of FIG. 4 with the mode selector structure in the first mode position and the brake structure manually moved into the releasing position.
Figure 8:
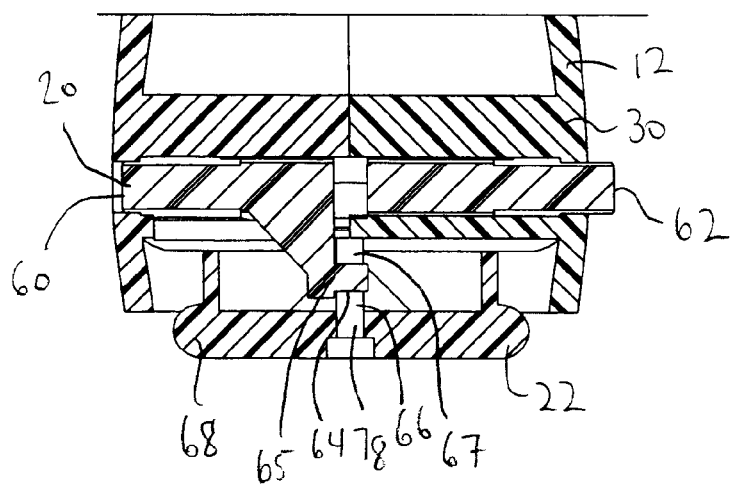
FIG. 8 is a cross-sectional view taken along line 8—8 of FIG. 5 with the mode selector structure in the second mode position and the brake structure in the releasing position.

The mode selector structure 20 is carried by the housing 12 for manual movement between a first mode position (as best shown in FIGS. 6 and 7) and a second mode position (as best shown in FIG. 8). In the illustrated embodiment, the mode selector structure 20 is in the form of a shiftable locking member mounted on the housing 12 adjacent an opposite end of the brake assembly 22 for movement in opposite directions in parallel relation of an axis of rotation of the reel 14 between the first and second mode positions. The locking member 20 has opposing ends 60, 62 that extend through respective openings provided in the mode selector portion 30 of the housing 12. When the mode selector structure 20 is in the first mode position, the end 60 extends outwardly from the housing 12 and the end 62 is positioned adjacent the exterior surface of the housing 12. Similarly, when the mode selector structure 20 is in the second mode position, the end 62 extends outwardly from the housing 12 and the end 60 is positioned adjacent the exterior surface of the housing 12. In the illustrated embodiment, the first mode position is an unlocked position and the second mode position is a locked position, as will be further discussed. The outwardly facing surfaces of the ends 60, 62 may include identifying indicia thereon to identify the unlocked and locked positions (i.e., an open padlock and a closed padlock).

Further, the mode selector structure 20 includes a first interlocking surface 64 provided on a hook 65 thereof that is interlockingly engagable with a second interlocking surface 66 provided on a clip 67 carried by the brake assembly 22, as will be further discussed.

The brake assembly 22 is constructed and arranged to hold the rule 16 in any position of extension outwardly of the opening 36 in the housing 12 and to release the rule 16 from any position in which it is held. The brake assembly 22 includes a brake member 68 that is disposed along the lower portion 34 of the housing extending from the opening 36 and is pivotally mounted thereon for pivotal movement about an axis intermediate opposite ends thereof between operative and releasing positions. Specifically, the brake member 68 includes the pair of projections 42 that are received within corresponding elongated recesses 40 provided in the housing 12 to enable the pivotal movement of the brake member 68.

Figure 3:
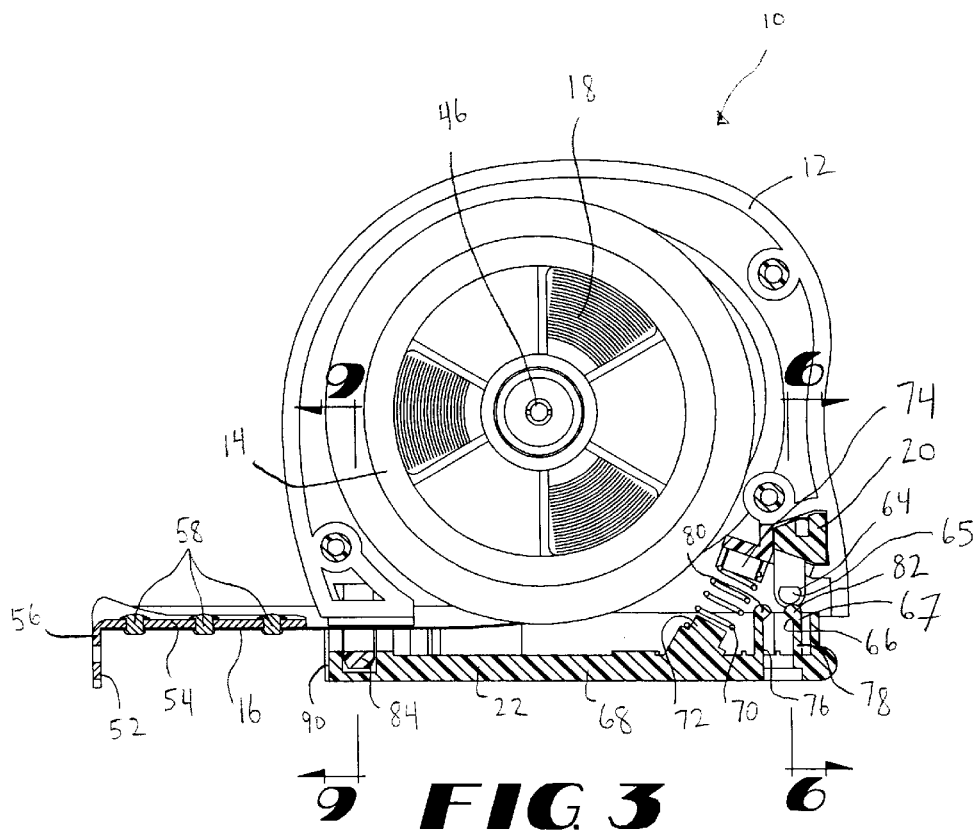
FIG. 3 is a cross-sectional view taken along line 3—3 of FIG. 1 with the mode selector structure in the first mode position and the brake structure biased into the operative position.

As best shown in FIG. 3, a compression coil spring 70 is mounted between the brake member 68 and the housing 12 to bias the brake member 68 to the operative position. Specifically, the brake member 68 includes a spring seat 72 at a rearward portion thereof and the housing 12 includes a spring seat 74 at a rearward portion thereof. The spring 70 is mounted between the spring seats 72, 74 so as to bias the brake member 68 to the operative position.

The second interlocking surface 66 is provided on the clip 67, which is positioned on a rearward portion of the brake member 68 adjacent the spring seat 72. The clip 67 includes a pair of opposing leg portions 76, 78 with free ends spaced apart from one another. Each leg portion 76, 78 includes a cam portion 80, 82 on the free end thereof that extends generally outwardly therefrom. The clip 67 is configured to interlock with the hook 65 provided on the mode selector structure 20, as will be further discussed.

The brake member 68 also includes a forward portion structured to mount a brake element 84. The brake element 84 has a generally arcuate shape and is movable along with the brake member 68 in an arcuate path between the operative and releasing positions. The brake element 84 has an arcuate braking surface 86 that is movable into wedging engagement with the rule 16 to engage and hold the rule 16 against the braking surface 38 on the housing 12 when the brake member 68 is in the operative position. Specifically, the braking surface 86 of the brake element 84 presses the rule 16 against the braking surface 38 of the housing 12 so as to wedge the rule 16 between the braking element 84 and the housing 12. The braking surface 86 is generally concave so as to conform to the convex side of the rule 16 and the braking surface 38 is generally convex so as to conform to the concave side of the rule 16. This results in firm frictional gripping of the rule 16 so that the extended portion of the rule 16 is tensioned between the housing 12 and the brake element 84. The frictional characteristics of the braking surfaces 38, 86 on the housing 12 and the brake element 84, respectively, may be augmented by providing friction generating patterns or coatings thereon, for example. The brake member 68 is pivoted away from the housing 12 to the releasing position to allow retraction of the rule 16. Thus, the braking surface 86 of the brake member 68 is engaged with the rule 16 when the brake member 68 is in the operative position and in spaced relation thereto when in the releasing position.

In other words, the brake member 68 is constructed and arranged to be spring biased into the operative position enabling outward movement of the rule 16 to be manually effected and retracting thereafter prevented. The brake member 68 can be moved into the releasing position to enable retraction of the rule 16 to occur.

Operation of the rule assembly 10 will now be described in greater detail. The rule assembly 10 includes the capability of selectively operating in either of two modes depending upon the position of a mode selector structure 20. When the mode selector structure 20 is in the first mode position (as shown in FIGS. 3, 4, 6, and 7), the brake assembly 22 is positioned to enable controlled retraction of the rule 16 toward and into the housing containing position under the bias of the spring system 18 after the rule 16 has been move outwardly from the housing 12 against the bias of the spring system 18 by the manual release of the brake assembly 22. When the mode selector structure 20 is in the second mode position (as shown in FIGS. 5 and 8), the brake assembly 22 is positioned to allow uncontrolled retraction of the rule 16 toward and into the housing containing position under the bias of the spring system 18 after the rule 16 has been manually moved outwardly from the housing 12 against the bias of the spring system 18.

Figure 9:
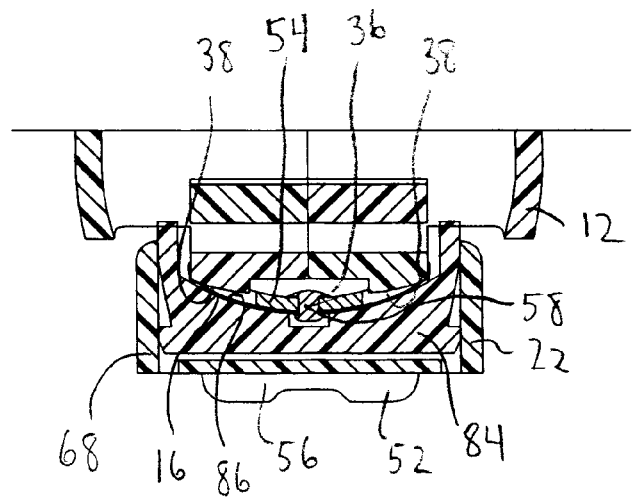
FIG. 9 is a cross-sectional view taken along line 9—9 of FIG. 3 with the brake structure in the operative position.

When in the first mode position, the mode selecting structure 20 is not interlocked with the brake member 68. FIG. 6 shows the hook 65 disengaged from the clip 67. As a result, the brake member 68 is normally spring biased into the operative position thereof, as shown in FIG. 3. Hence, the brake element 84 of the brake member 68 is biased into wedging engagement with the rule 16 to prevent retraction of the rule 16 into the housing 12, as shown in FIG. 9.

Figure 4:
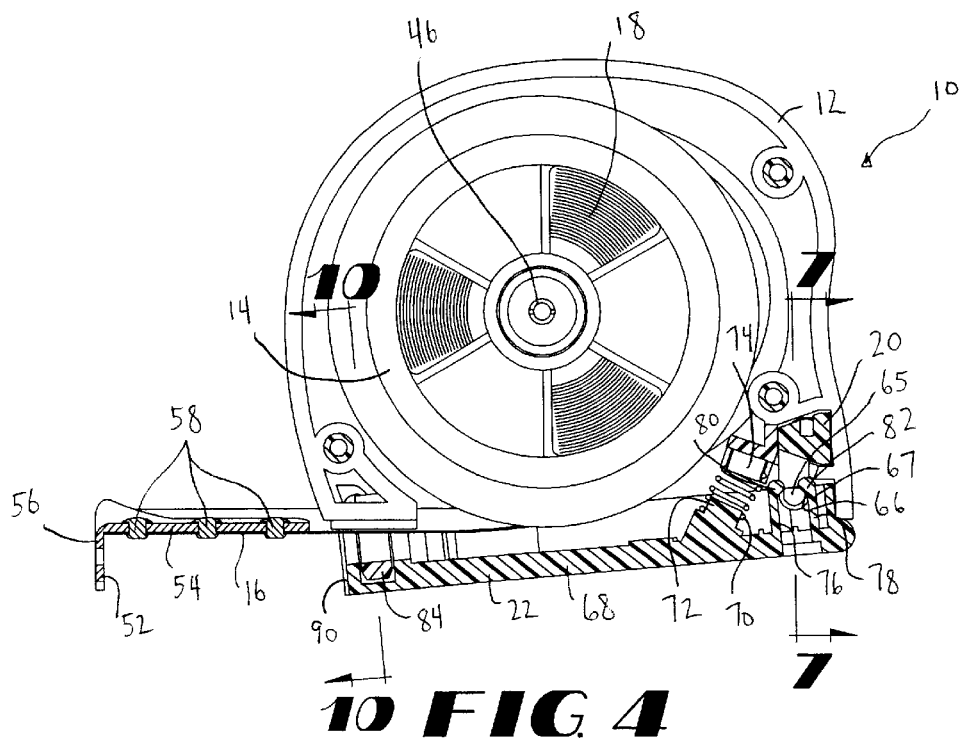
FIG. 4 is a cross-sectional view with the mode selector structure in the first mode position and the brake structure manually moved into the releasing position.
Figure 5:
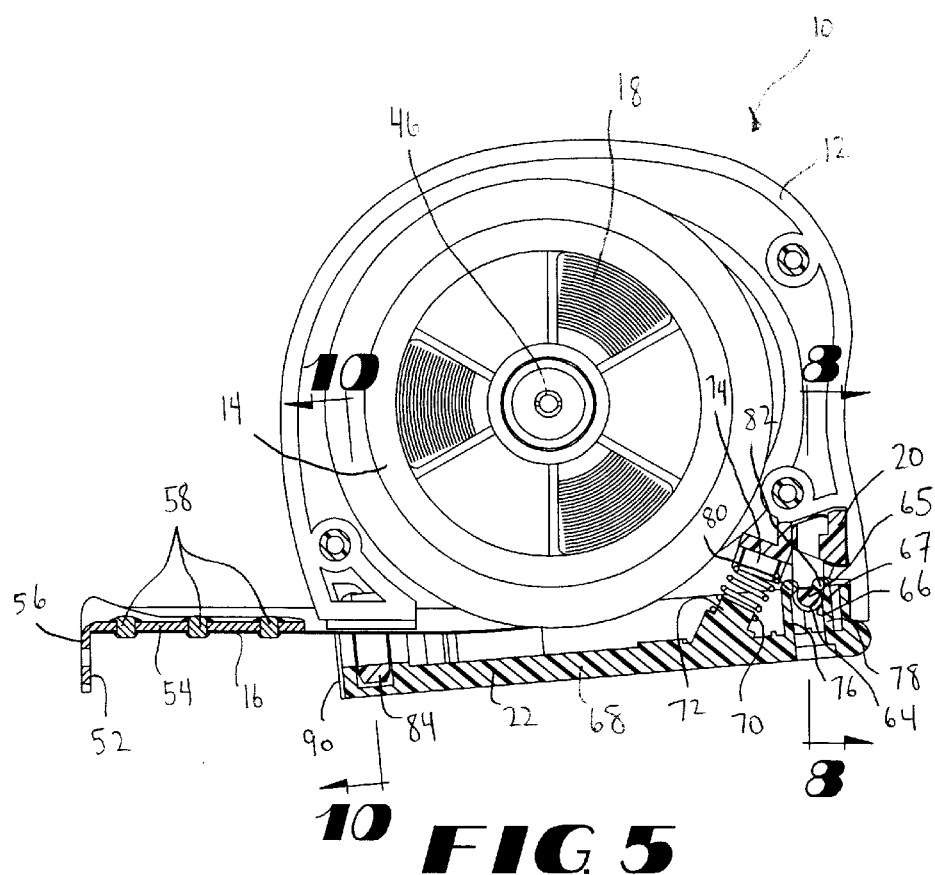
FIG. 5 is a cross-sectional view with the mode selector structure in the second mode position and the brake structure in the releasing position.
Figure 10:
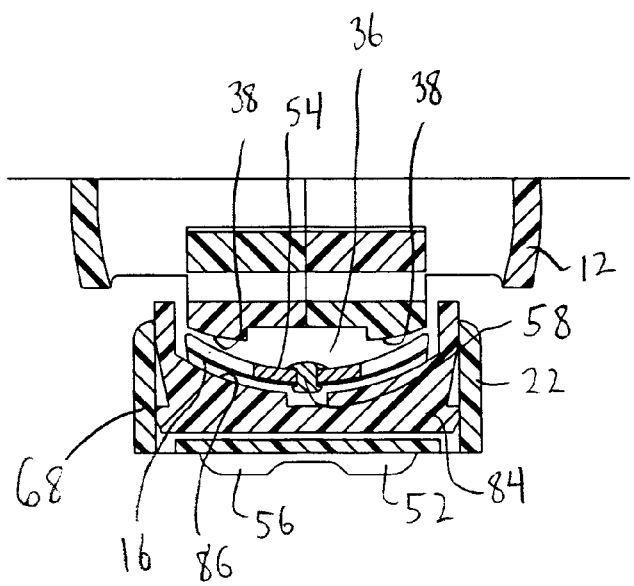
FIG. 10 is a cross-sectional view taken along line 10—10 of FIGS. 4 and 5 with the brake structure in the releasing position.

When manual pressure is applied to the rearward portion of the brake member 68, the brake member 68 pivots to the releasing position against biasing from the spring 70 which moves the brake element 84 downwardly away from the housing 12 and releases the brake element 84 from wedging engagement with the rule 16, as shown in FIGS. 4 and 10. In the first mode position, the mode selector structure 20 is positioned such that the hook 64 and the clip 66 do not interlockingly engage one another when the brake member 68 is manually moved to the releasing position, as shown in FIG. 7. At this point, the rule 16 can be freely retracted into and out of the housing 12. Specifically, when the rule 12 is released, the spring system 18 rotates the reel 14 with respect to the housing 12 in a blade winding direction to wind the rule 16 around the reel 14. Removing the manual pressure from the brake member 68 causes the spring 70 to bias the braking element 84 upwardly towards the housing 12 and back into the operative position in which the rule 16 is locked in an extended position.

When in the second mode position, the mode selecting structure 20 is interlocked with the brake member 68 so as to lock the brake member 68 in the releasing position. FIG. 8 shows the first and second interlocking surfaces 64, 66 interlocking with one another when the mode selector structure 20 is in the second mode position. As a result, the brake member 68 is locked in the releasing position thereof against the bias of the spring 70, as shown in FIG. 5 and 10. Hence, the rule 16 is not acted upon by the brake element 84 of the brake member 68 so as to allow uncontrolled retraction of the rule 16 into and out of the housing 12 without having to maintain pressure on the brake member 68.

When in the second mode position, the user can manually hold the rule 16 in an extended position to prevent the rule 16 from retracting back into the housing 12. The rule assembly 10 may include a thumb brake that is movable to a braking position to lock the rule 16 in an extended position when the mode selecting structure 20 is in the second mode position.

To retain the brake member 68 in the releasing position, the rearward portion of the brake member 68 is pivoted upwardly to the releasing position and the mode selector structure 20 is moved horizontally so as to interlock the first and second interlocking surfaces 64, 66 (i.e., hook 65 and clip 67). Specifically, when the mode selector structure 20 is moved to the second mode position, by manually pushing in on the end 60 that extends outwardly from the housing 12, the hook 65 is moved into interlocking engagement with the clip 67 provided on the brake member 68, as shown in FIG. 8.

The first and second interlocking surfaces 64, 66 are positioned and configured to be moved into interlocking relation in either of two directions depending upon whether the mode selector structure 20 is moved in the second mode position before or after the brake member 68 is moved into the releasing position thereof. Specifically, the user can first hold the brake member 68 in the releasing position and then slide the mode selector structure 20 into the second mode position that will move the surface 64 of the hook 65 longitudinally between the leg portions 76, 78 of the clip 67 providing the surface 66 to hold the brake member 68 in the releasing position.

Alternatively, the user can first slide the mode selector structure 20 into the second mode position and then pivot the brake member 68 into the releasing position. As the hook 65 is moved between the leg portions 76, 78 of the clip 67, the surface 64 of the hook 65 engages the cam portions 80, 82 so as to flex the resilient leg portions 76, 78 outwardly away from one another, thereby allowing the hook 65 to move between the leg portions 76, 78. Thereafter, the leg portions 76, 78 resiliently return inwardly toward one another with a snap-action to secure the hook 65 between the leg portions 76, 78 of the clip 67 with the interlocking surfaces 64, 66 interlocking with one another to lock the brake member 68 in the releasing position.

The brake member 68 can be unlocked from the releasing position by manually pushing in on the end 62 that extends outwardly from the housing 12 so as to withdraw the hook 65 out of interlocking engagement with the clip 67. This moves the mode selector structure 20 from the second mode position into the first mode position, which allows the spring 70 to pivot the brake member 68 into the operative position.

When taking a measurement, the user typically holds the housing 12 in one hand and manually pulls the rule 16 out of the housing 12 with the other hand. In the first mode position, when a sufficient length of rule 16 has been withdrawn from the housing 12, the user can release the rule 12 which is normally locked by the brake member 68 to prevent the rule 16 from retracting back into the housing 12. When the measurement has been taken, the user simply releases the braking member 68 from wedging engagement with the rule 16 by pivoting the brake element 84 out of wedging engagement with the rule 16.

In the second mode position, when a sufficient length of rule 16 has been withdrawn from the housing 12, the user can manually hold the rule 16 to prevent the rule 16 from retracting back into the housing 12. When the measurement has been taken, the user simply releases the rule 16 to allow uncontrolled retraction of the rule 16 into the housing 12.

The hook 52 provided on the end of the rule 16 abuts a stop surface 90 of the brake member 68 when the rule 16 is fully retracted into the interior of the housing 12. The stop surface 90 is spring biased toward a position to be engaged by the hook 52 when the rule 16 is moved into the housing contained position thereof so that shock absorption by spring bias is provided for the engagement of the hook 52 with the stop surface 90 when the mode selector structure 30 is in either the first or second mode position thereof. To absorb the impact between the hook 52 and the stop surface 90 of the brake member 68, the elongated recesses 40 in the housing 12 are configured to have a longitudinal axis that is in parallel relation with an axis of the spring 70 such that the spring 70 biases the projections 42 of the brake member 68 to a forward portion of the elongated recesses 40. At impact, the projections 42 and hence the brake member 68 are movable towards a rearward portion of the elongated recesses 40 along the longitudinal axis against biasing of the spring 70. Thus, the spring 70 acts as a shock absorber to lessen the impact of the hook 52 abutting the stop surface 90 of the brake member 68. This feature is useful when the mode selector structure 20 is in either the first or second mode position. However, this feature is particularly useful when the mode selector structure 20 is in the second mode position because the hook 52 abuts the stop surface 90 at a high velocity due to uncontrolled retraction. When the mode selector structure 20 is in the first mode position, the brake member 68 can control the speed of the rule 16 into the housing 12 when the rule 16 is retracted such that the hook 52 abuts the stop surface 90 at a lower velocity.

It can thus be appreciated that the objectives of the present invention have now been fully and effectively accomplished. The foregoing specific embodiments have been provided to illustrate the structural and functional principles of the present invention, and are not intended to be limiting. To the contrary, the present invention is intended to encompass all modification, alterations and substitutions within the spirit and scope of the appended claims.

What is claimed is:

1. A dual mode rule assembly comprising:
    a housing having an opening;
    a reel rotatably mounted in said housing;
    an elongated rule connected to said reel so as to wind therearound into a housing contained position wherein an end of said rule extends from said opening in a position to be manually engaged;
    a spring system for biasing said reel in a direction to wind said rule around said reel into said housing contained position and enabling said rule to be manually moved outwardly of said opening against the bias of said spring system;
    a mode selector structure carried by said housing for manual movement between first mode and second mode positions; and
    a manually releasable spring-biased brake assembly operatively associated with said mode selector structure, wherein when said mode selector structure is in said first mode position said manually releasable spring-biased brake assembly is positioned to enable controlled retraction of said rule toward and into said housing containing position under the bias of said spring system after said rule has been manually moved outwardly from the housing against the bias of said spring system by the manual release of said manually releasable brake assembly, and wherein when said mode selector structure is in said second mode position said manually releasable spring-biased brake assembly is positioned to allow uncontrolled retraction of said rule toward and into said housing containing position under the bias of said spring system after said rule has been manually moved outwardly from the housing against the bias of said spring system.

2. The dual mode rule assembly according to claim 1, wherein said manually releasable spring-biased brake assembly includes a brake member constructed and arranged to be (1) spring biased into an operative position enabling outward movement of said rule to be manually effected and retracting thereafter prevented and (2) manually moved into releasing position enabling retraction to occur, said mode selector structure being constructed and arranged to be operable (1) when in said first mode position to allow said brake member to be spring biased into the operative position thereof when no longer manually moved into the releasing position thereof and (2) when in said second mode position to lock said brake member in said releasing position after having been manually moved therein.

3. The dual mode rule assembly according to claim 2, wherein said mode selector structure is constructed and arranged to be moved into said second mode position either before or after said brake member is moved into said releasing position to lock the same therein.

4. The dual mode rule assembly according to claim 2, wherein said mode selector structure and said brake member include first and second interlocking surfaces, the first and second interlocking surfaces interlocking with one another when said mode selector structure is in the second mode position and the brake member is in the releasing position.

5. The dual mode rule assembly according to claim 4, wherein said first and second interlocking surfaces are positioned and configured to be moved into interlocking relation in either of two directions depending upon whether said mode selector structure is moved in said second mode position before or after said brake member is moved into said releasing position thereof.

6. The dual mode rule assembly according to claim 4, wherein said interlocking surfaces are provided on a hook carried by the mode selector structure and a clip carried by said brake member.

7. The dual mode rule assembly according to claim 2, wherein said brake member is disposed along a lower portion of said housing extending from said opening and is pivotally mounted thereon for pivotal movement about an axis intermediate opposite ends thereof between said operative and releasing positions, said housing and brake member providing cooperating brake surfaces adjacent said opening on opposite sides of said rule extending therethrough, the brake surface provided by said brake member being disposed on one of the opposite ends of said brake member in engagement with said rule when in said operative position and in spaced relation thereto when in said releasing position.

8. The dual mode rule assembly according to claim 7, wherein the brake surface of the brake member is provided on an arcuate brake element provided on the brake member.

9. The dual mode rule assembly according to claim 7, further comprising a compression coil spring positioned between the other of the opposite ends of said brake member and said housing to bias said brake member to said operative position.

10. The dual mode rule assembly according to claim 9, wherein said rule has a hook on a free end thereof, said brake member including a stop surface spring biased toward a position to be engaged by said hook when said rule is moved into the housing contained position thereof, said lower portion of said housing including a pair of elongated recesses configured to receive a corresponding projection provided on said axis intermediate opposite ends of said brake member to enable said pivotal movement of said brake member about said axis, said elongated recesses having a longitudinal axis that is in parallel relation with an axis of said compression coil spring such that said compression coil spring biases said projections to a forward portion of said elongated recesses, said projections being movable towards a rearward portion of said elongated recesses along said longitudinal axis against biasing of said compression coil spring when said stop surface of said brake member is engaged by said hook so that shock absorption by spring bias is provided for the engagement of said hook with said stop surface when said mode selector structure is in either the first or second mode position thereof.

11. The dual mode rule assembly according to claim 2, wherein said mode selector structure comprises a shiftable locking member mounted on said housing adjacent an opposite end of said brake member for movement in opposite directions in parallel relation of an axis of rotation of said reel between said first and second mode positions.

12. The dual mode rule assembly according to claim 2, wherein said rule has a hook on a free end thereof, said brake member including a stop surface spring biased toward a position to be engaged by said hook when said rule is moved into the housing contained position thereof so that shock absorption by spring bias is provided for the engagement of said hook with said stop surface when said mode selector structure is in either the first or second mode position thereof.

13. The dual mode rule assembly according to claim 1, wherein the spring system is a coil spring.

14. The dual mode rule assembly according to claim 1, wherein said housing includes first and second housing halves.

15. The dual mode rule assembly according to claim 1, wherein said rule has a hook on a free end thereof, said spring biased brake assembly including a stop surface spring biased toward a position to be engaged by said hook when said rule is moved into the housing contained position thereof so that shock absorption by spring bias is provided for the engagement of said hook with said stop surface when said mode selector structure is in either the first or second mode position thereof.

\* \* \* \* \*

UNITED STATES PATENT AND TRADEMARK OFFICE
CERTIFICATE OF CORRECTION

PATENT NO. : 6,643,948 B1
DATED : November 11, 2003
INVENTOR(S) : Seymour, Daniel It is certified that error appears in the above-identified patent and that said Letters Patent is hereby corrected as shown below:

Title page,
Item [73], should read:
-- [73] Assignee: The Stanley Works
                  New Britain, CT --

Signed and Sealed this

Twentieth Day of April, 2004

JON W. DUDAS
*Acting Director of the United States Patent and Trademark Office*